Feb. 28, 1950     M. FUNKHOUSER     2,498,802

SHOCK ABSORBER

Filed Aug. 20, 1947

INVENTOR
MEARICK FUNKHOUSER
BY
Spencer, Hardman and Feher
HIS ATTORNEYS.

Patented Feb. 28, 1950

2,498,802

UNITED STATES PATENT OFFICE 2,498,802

SHOCK ABSORBER

Mearick Funkhouser, Dayton, Ohio, assignor to General Motors Corporation, Detroit, Mich., a corporation of Delaware Application August 20, 1947, Serial No. 769,591

1 Claim. (Cl. 188—100)

This invention relates to improvements in direct acting hydraulic shock absorbers.

It is among the objects of the present invention to provide a hydraulic shock absorber with positive yet simple means for attaching a head member of the working cylinder within the cylinder.

Further objects and advantages of the present invention will be apparent from the following description, reference being had to the accompanying drawings, wherein a preferred form of embodiment of the present invention is clearly shown.

Figures 1, 2:
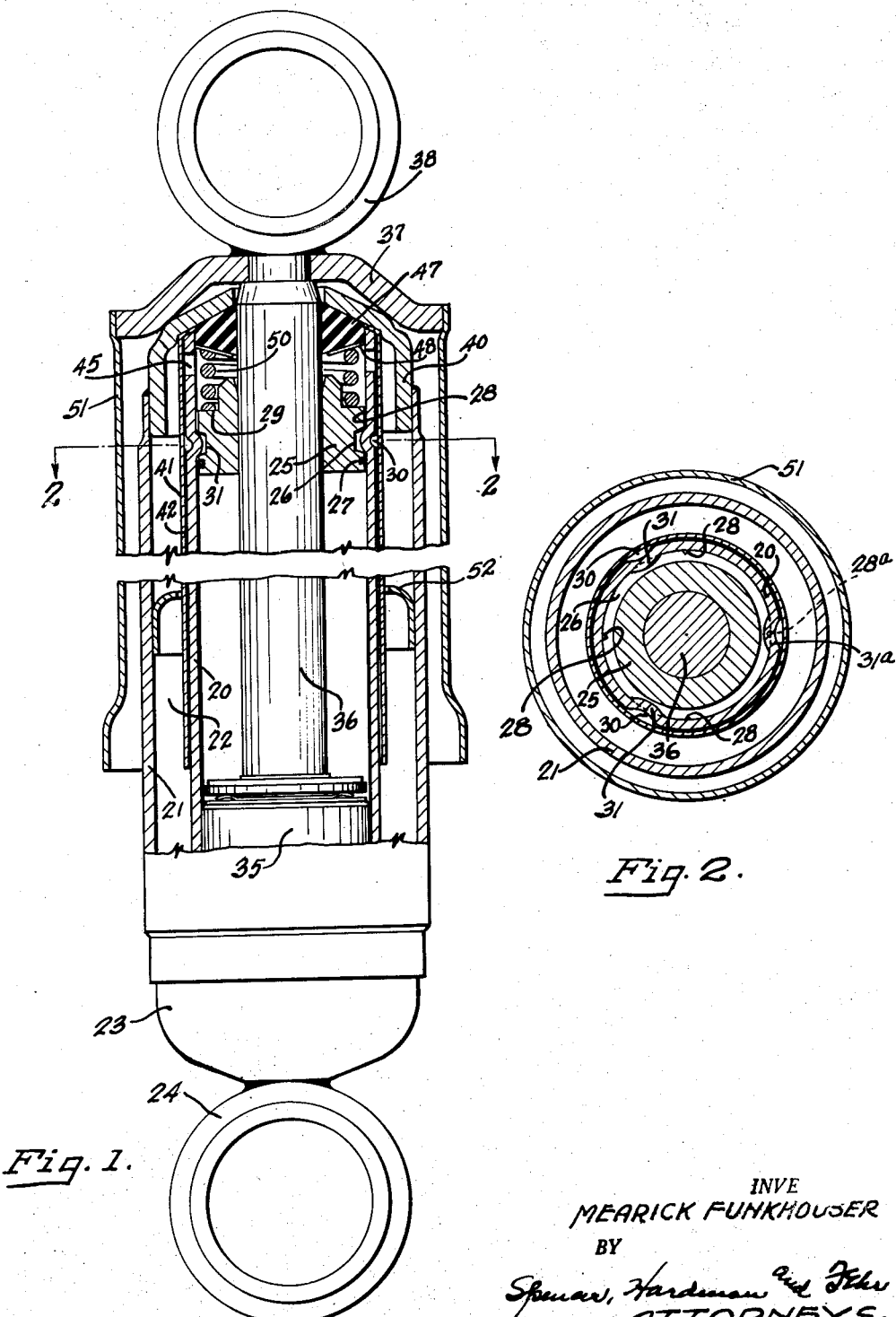
Fig. 1 is a fragmentary, longitudinal sectional view of the shock absorber equipped with the present invention.
Fig. 2 is a transverse sectional view taken on the line 2—2 of Fig. 1.

Referring to the drawings, the numeral 20 designates the working cylinder of the shock absorber, surrounded by a larger tubular member 21 which forms the annular space 22 around the working cylinder and provides the fluid containing reservoir of the shock absorber. Both tubular members 20 and 21 are supported by a closure cap 23 in any suitable manner said closure cap having a ring 24 secured thereto for purposes of attaching this end of the shock absorber to one of the relatively movable members whose movements the shock absorber is adapted to control.

A head member or plug 25 fits into the shock absorber said head member having a central aperture. In the outer peripheral surface of this plug 25 there is provided an annular groove 26 and another comparatively narrow groove 27. The groove 27 is closer the inner end surface of the plug 25 than is the groove 26. Longitudinal grooves 28 are also provided in the peripheral surface of plugs 25 extending from end to end thereof, these longitudinal grooves 28 connecting the two annular grooves 26 and 27 together and terminating in both end surfaces of the plug 25. In the present construction, longitudinal grooves 28 are arranged in pairs, the two grooves of each pair being diametrically opposite. The outer end surface of plug 25 has a cut away portion forming a shoulder 29.

In order to secure the plug 25 within the cylinder so that it cannot move lengthwise of the cylinder in either direction dents 30 are formed in the wall of the cylinder 20, these dents providing inwardly extending humps 31 which project into the wider annular groove 26. Hump portions 31 engage both edges of this annular groove and thereby lock the plug 25 in the cylinder so that it cannot move in either direction longitudinally thereof.

A piston 35 is provided in the working cylinder, said piston having a rod 36 attached thereto which slidably extends through the central aperture in the plug or end member 25, the outer end of said rod having an annular disc 37 and a ring 38 secured thereto in any suitable manner thereto preferably by welding. Ring 38 provides means for attaching this portion of the shock absorber to the other relatively movable member whose movement the shock absorber is adapted to control.

Fitting into the end of the outer tubular member 21 opposite the closure member 23 is a cover cap 40 centrally apertured to permit the piston rod therethrough. This cap 40 may be secured to the tube 21 in any suitable manner as by welding. Surrounding the cylinder 20 is another tubular member 41 of such a diameter as to provide a narrow annular space 42 around the cylinder 20. One end of this tube 41 extends downwardly into the reservoir beneath the normal level of the fluid therein, the other or upper end having an inwardly extending flange which rests upon the upper end of the cylinder which is the end opposite the closure member 23. When the cap 40 is placed within the tube 21 it is pushed down in said tube until tubular member 41 is clamped upon the end surface of the cylinder 21 and the cylinder 21 in turn clamped tightly upon the closure member 23 after which said cap 40 is welded or attached to the tube 21 thereby holding the cylinder 20 and its surrounding tube 41 securely in position.

Adjacent the end of the cylinder 20 engaged by the inwardly extending flange of tube 41 are openings 45 provided in the cylinder wall which provide communication between the space 42 about the outside of the cylinder and within the tube 41 and the space between the plug 25 and the cover cap 40 of the cylinder. In this last mentioned space there is provided a packing gland 47 of any suitable resilient material, said packing gland surrounding and snugly fitting about the piston rod 36. It also fits against the inner surface of the cover cap 40 and the inner end surface of the tube or cylinder 20. An abutment ring 48 is provided on the side of the packing gland 47 opposite the side engaging the cover cap 40 and between this abutment ring 48 and the shoulder 29 on plug 25 a spring 50 is interposed, this spring exerting a pressure upon the abutment ring 48 to compress the packing gland 47 so that it will sealingly engage the piston rod 36, the inner surface of the cover cap 47 and the engaged inner portion of the cylinder 20, thereby sealing these surfaces against fluid leak.

An outside tube 51 fits about and is secured to the annular disc 37 and forms a guard about tube 21 protecting it against damage by flying stones or the like when the shock absorber forms equipment on a road vehicle.

Within the reservoir there is provided a baffle 52 secured within the tube 21 and centrally apertured so that its inner annular edge is spaced from the tubular member 41 to provide a restricted passage connecting the portion of the reservoir about this baffle plate with the portion therebeneath.

Any air in the fluid within the cylinder will pass through the longitudinal grooves 28 in the plug into the space above the plug and out through openings 45 into the annular space within tubular member 41 this air being ejected from said space beneath the level of said fluid in the reservoir from where said air will rise and be trapped above the level of the fluid therein. The dents 30 in the wall of the cylinder are preferably one less or one more in number than the number of longitudinal grooves 28 in the plug, or in case where an equal number of dents and longitudinal grooves are to be provided the spacing of the grooves differentiate from the spacing of the dents. The purpose of this is to prevent the inwardly extending protuberances 31 formed by the dents from shutting off communication between both sides of the plug 25 through the longitudinal grooves 28. In the present instance, three dents 30 are provided and four longitudinal grooves 28 as shown in Fig. 2. The longitudinal groove 28a in Fig. 2 is shown closed by the inwardly extending portion 31a due to the fact that the dent in the cylinder wall in this instance is directly in the path of and closes the longitudinal groove 28a. Any air which enters from the cylinder through the longitudinal groove 28a will pass into the narrow annular groove 27 and from thence it may enter any of the other remaining longitudinal grooves 28 and be ejected into the space between the plug 25 and the packing 47. Thus the narrow annular groove 27 connects all longitudinal grooves and thereby eliminates inoperativeness of any one longitudinal groove which might be closed by the alignment of a dent in the cylinder wall.

In the present construction the simple provision of dents causing extensions or bumps to enter a groove in the head member secures said head member against any relative longitudinal movement within the cylinder.

While the embodiment of the present invention as herein disclosed, constitutes a preferred form, it is to be understood that other forms might be adopted, all coming within the scope of the claim which follows.

What is claimed is as follows:

A hydraulic shock absorber comprising a working cylinder; a plug fitted into said cylinder; longitudinal grooves in the surface of the plug fitting the cylinder; an annular groove in said surface, intersecting all of the longitudinal grooves; a plurality of dents in the wall of the cylinder, forming protuberances extending into said annular groove for securing the plug against longitudinal movement in either direction in the cylinder, the number of said dents differing from the number of said longitudinal grooves to avoid closing and rendering inoperative all said longitudinal grooves by the protuberances; and an annular feeder groove in the plug between the first mentioned annular groove and the end of the plug within the cylinder, said feeder groove communicating with all of the longitudinal grooves.

MEARICK FUNKHOUSER.

REFERENCES CITED

The following references are of record in the file of this patent:

UNITED STATES PATENTS

| Number | Name | Date |
|---|---|---|
| 2,171,827 | Elliott | Sept. 5, 1939 |
| 2,214,038 | Beecher | Sept. 10, 1940 |
| 2,351,662 | Christofel | June 20, 1944 |

FOREIGN PATENTS

| Number | Country | Date |
|---|---|---|
| 101,401 | Australia | June 21, 1937 |